Feb. 28, 1939.　　　J. R. FITZGERALD　　　2,149,166
DISTRIBUTING MACHINE
Filed June 14, 1937　　　4 Sheets-Sheet 1
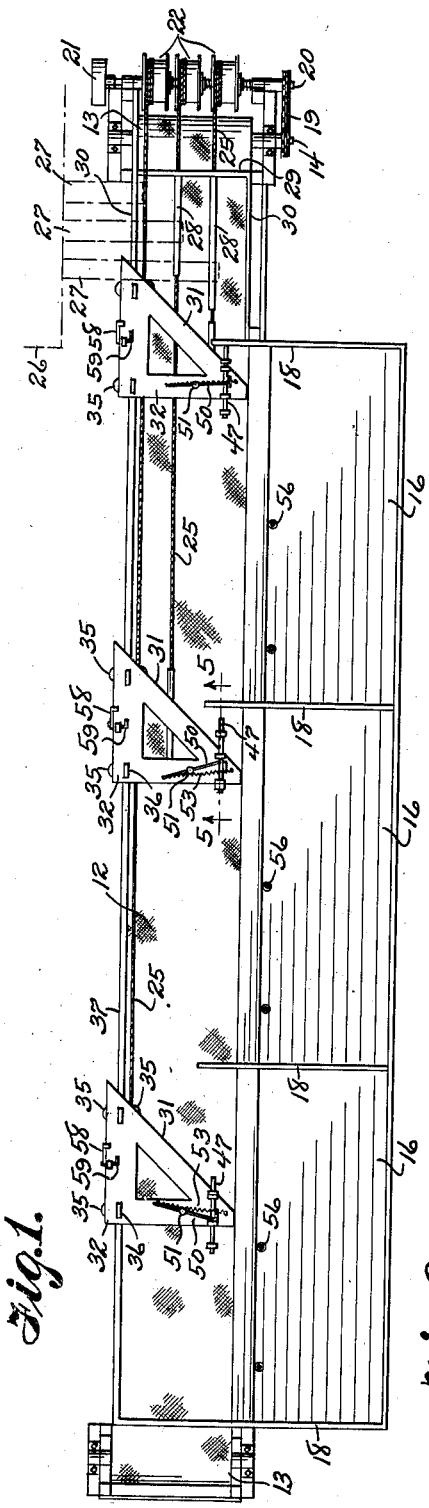
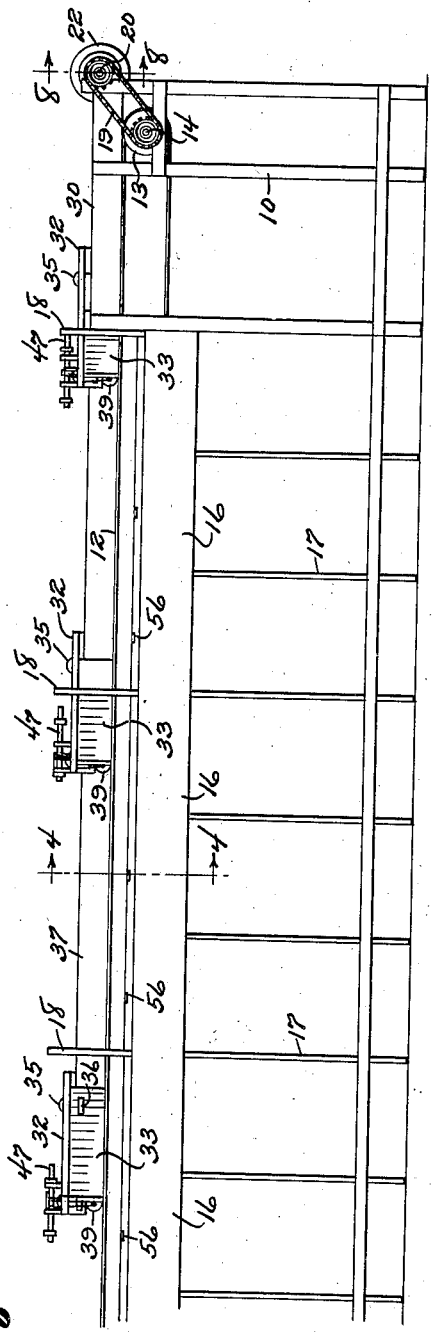
John R. Fitzgerald INVENTOR
BY Victor J. Evans & Co.
ATTORNEYS Feb. 28, 1939.  J. R. FITZGERALD  2,149,166
DISTRIBUTING MACHINE
Filed June 14, 1937  4 Sheets-Sheet 2
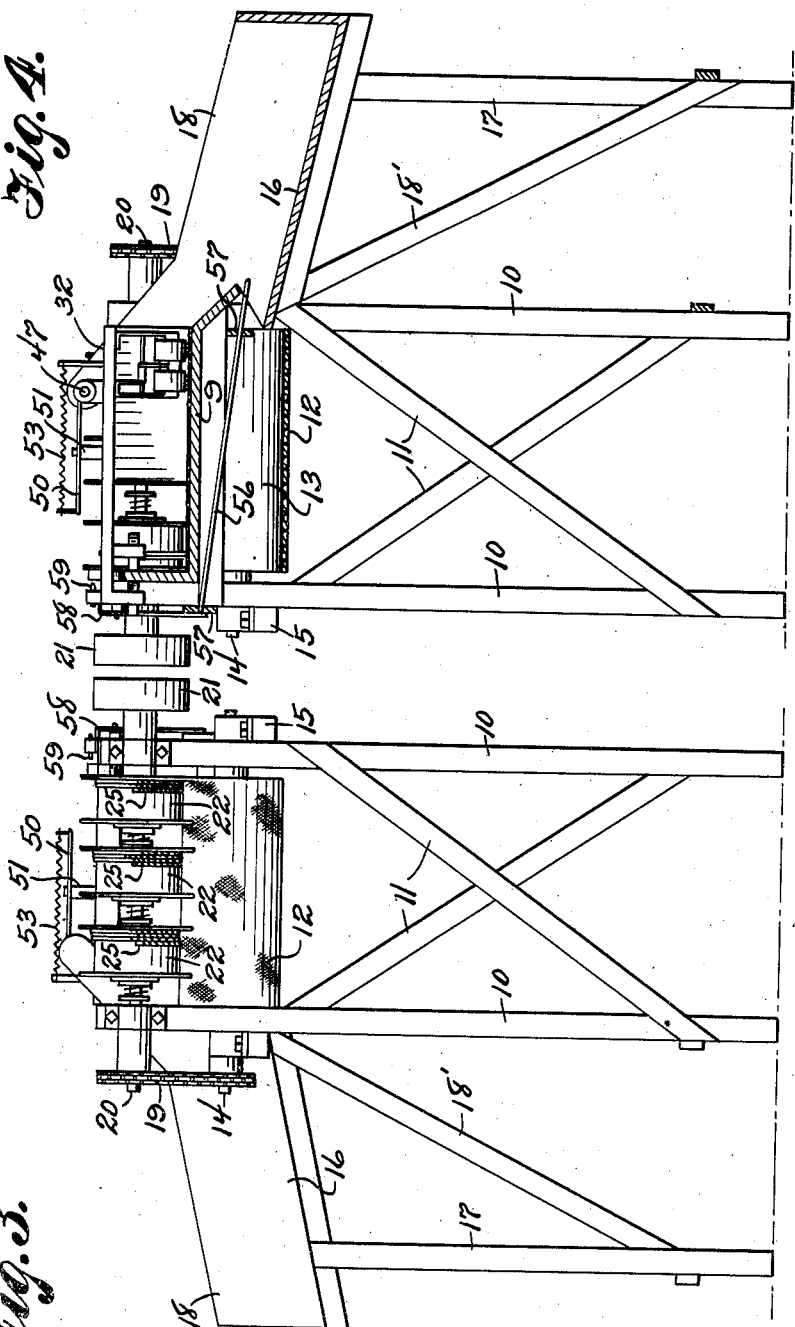
John R. Fitzgerald INVENTOR
BY Victor J. Evans & Co.
ATTORNEYS Feb. 28, 1939.   J. R. FITZGERALD   2,149,166
DISTRIBUTING MACHINE
Filed June 14, 1937   4 Sheets-Sheet 3
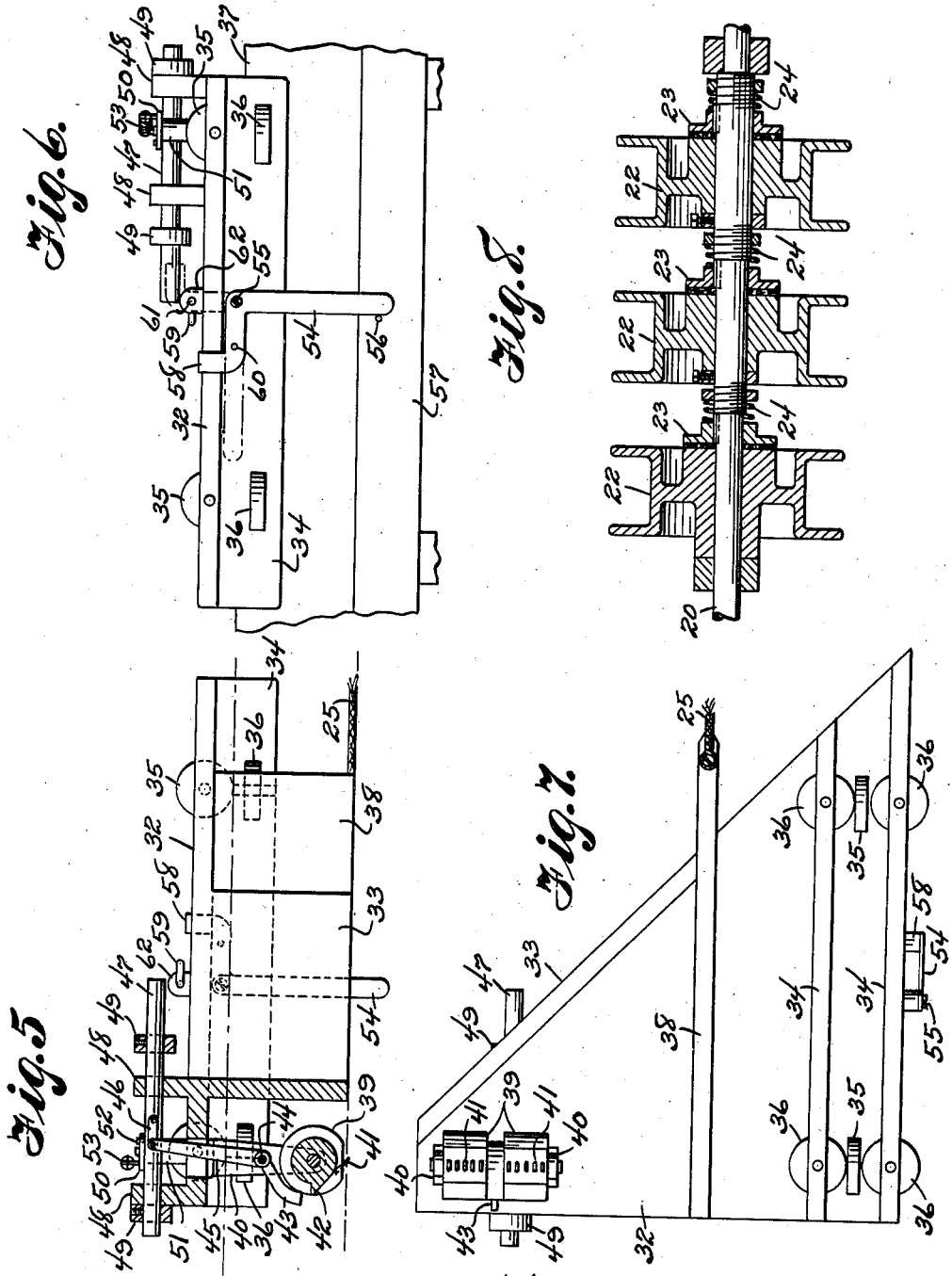
John R. Fitzgerald INVENTOR
BY Victor J. Evans & Co.
ATTORNEYS Feb. 28, 1939. J. R. FITZGERALD 2,149,166
DISTRIBUTING MACHINE
Filed June 14, 1937 4 Sheets-Sheet 4
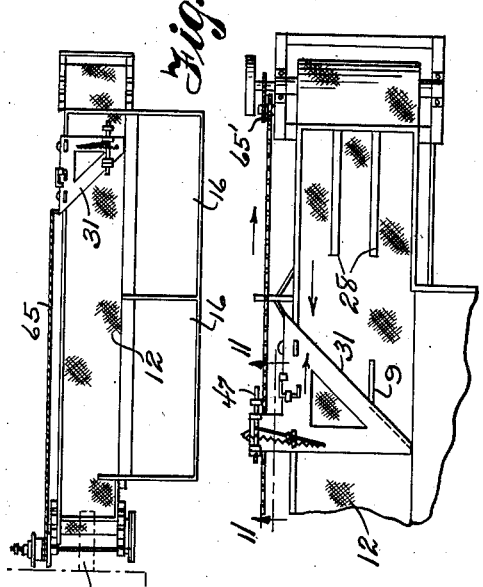
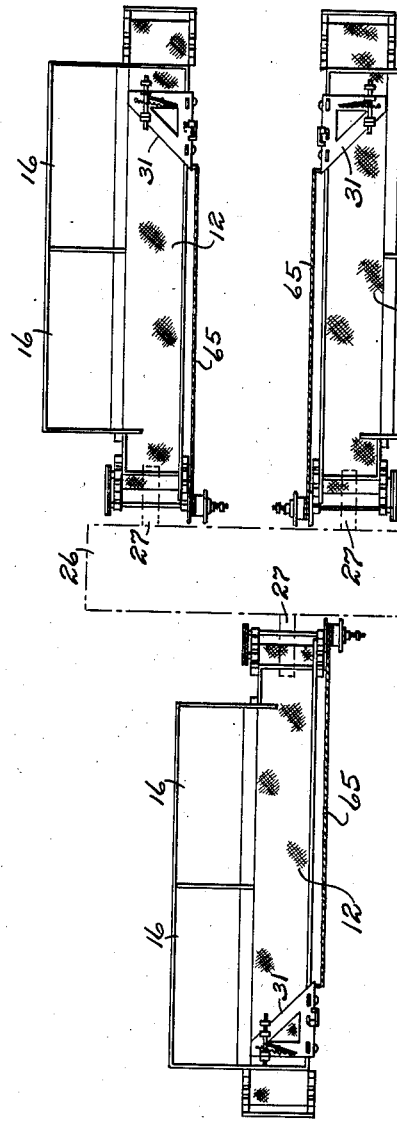
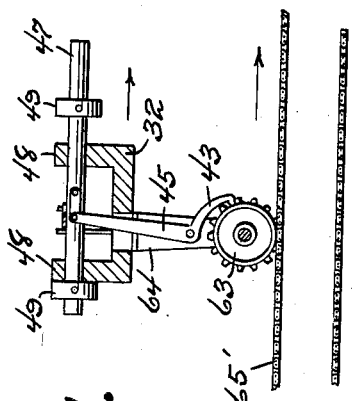
John R. Fitzgerald
INVENTOR
BY Victor J. Evans & Co.
ATTORNEYS Patented Feb. 28, 1939

2,149,166

UNITED STATES PATENT OFFICE 2,149,166

DISTRIBUTING MACHINE

John R. Fitzgerald, Harlingen, Tex.

Application June 14, 1937, Serial No. 148,220

10 Claims. (Cl. 198—42)

This invention relates to distributing machines and more particularly to machines for distributing fruit such as apples, tomatoes, oranges and the like to the packing bins after the fruit has been separated into a number of different sizes.

An object of the invention is to provide a machine of this type having novel deflectors for sweeping the fruit into packers bins while the fruit, graded as to size, travels in separated lanes along an endless conveyor.

A further object is to provide individual manual controls whereby the packers may independently of each other control the supply of fruit during delivery to their respective bins.

A further object is to provide a machine of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of a distributing machine constructed in accordance with the invention and adapted to deliver three different sizes of fruit to associated packers bins.

Figure 2 is a side elevation of the machine shown in Figure 1.

Figure 3 is an end elevation of the machine looking toward the winding drums.

Figure 4 is a cross sectional view of the machine taken on the line 4—4 of Figure 2.

Figure 5 is an enlarged detail cross sectional view taken on the line 5—5 of Figure 1 and showing the device for connecting and disconnecting a deflector for travel as a unit in the same direction as the conveyor belt.

Figure 6 is a detail side elevation showing the manual control lever and associated parts whereby each packer may control the supply of fruit being delivered to his bin.

Figure 7 is a bottom plan view of one of the deflectors.

Figure 8 is a detail cross sectional view of the winding drums taken on the line 8—8 of Figure 2.

Figure 9 is a plan view of a modified form of the distributing machine.

Figure 10 is an enlarged fragmentary plan view showing the deflector and chain drive of the modified form of the invention.

Figure 11 is a detail longitudinal sectional view taken on the line 11—11 of Figure 10.

Referring now to the drawings in which like characters of reference designate similar parts in the various views, 10 designates supporting legs which are braced by diagonal intersecting braces 11, and carry a support 9 for an endless conveyor comprising a canvas or other belt 12 which is trained over rollers 13 having their shafts 14 journaled in bearings disposed on longitudinal frame bars 15 of the machine.

Disposed laterally of the endless conveyor are a plurality of packers bins 16 supported upon legs 17 which are braced by braces 18. These bins correspond in number to the number of graded sizes of fruit to be packed, and in the present embodiment of the invention, by way of example, three of such bins are shown to receive respectively, large, intermediate, and small sizes of fruit. The bins are separated by partitions 18 which overlap the upper side of the conveyor belt 12. The projecting ends of the partitions perform the function of stops to actuate mechanism for reversing the direction of travel of hereinafter described deflectors 31.

The endless conveyor is continuously driven by a chain drive 19 driven by a shaft 20 which is equipped with a pulley 21 to which power may be applied from any source.

Winding drums 22 are disposed on the shaft 20, these drums being equal in number to the number of different lanes of fruit of graded sizes delivered to the bins in the present embodiment three drums being shown. Each drum is loose on the shaft and is clutched thereto by a friction clutch comprising a clutch disc 23 and a spring 24 so that the pulley may be driven in one direction by the shaft 20 to wind a cable 25 thereon and may idle on the shaft when the cable is being unwound therefrom by its associated deflector 31.

The fruit is delivered to the endless conveyor near the winding drums by a grader 26 of conventional form, the different sizes emerging from respective spouts 27 which overlie the top side of the endless conveyor. The spouts are of different lengths so that the graded fruit will be delivered by each individual spout at a different distance from the edge of the belt than the next succeeding spout, whereby for example, three lanes of graded fruit, large size, intermediate size, and small size, respectively, will progress down the conveyor to respective packers bins. Longitudinal partitions 28 cooperate with an end wall 29 and with longitudinal walls 30 disposed at the intake end of the conveyor, to maintain the lanes separated until the fruit settles on the belt and stops rolling about. Thereafter, the winding cables 25 separate the lanes of fruit.

Deflectors 31 are superposed at spaced intervals apart on the top side of the belt. The deflectors are dragged along the belt in a direction counter to the direction of travel of the belt, by winding up of their respective cables 25 upon the winding drums 22, and rake the lanes of fruit from the belt into associated packers bins 16. Each deflector is provided with means to connect the deflector for moving as a unit with the belt to return it to initial position after each raking operation.

More specifically, each deflector comprises a substantially triangular top 32 and a front wall 33 which extends obliquely across the belt. The front walls 33 of the three deflectors are of different lengths, for example, the wall of the first deflector associated with the bin nearest the grader is comparatively short so that two lanes of fruit will pass undisturbed along the belt to the next succeeding deflector the wall of which is of greater length so that but one lane of fruit will pass to the final deflector, the wall of which extends the entire width of the belt.

The top 32 of each deflector is equipped with guide strips 34, as best shown in Figure 7. The guide strips are equipped with rollers 35 that coact with rollers 36 carried by the top of the deflector in engaging a longitudinal rear rail 37 that extends along the rear side of the conveyor support 9 opposite the bins, as best shown in Figures 1 and 2. The deflector is supported by the rail and also by a runner 38 which is of substantially the same height as the front oblique wall of the deflector and rides upon the belt. The cable 25 is preferably attached to this runner as shown in Figure 7.

For reversing the direction of movement of the deflector when it arrives at its end of stroke a roller 39 is journaled in hangers 40 which depend from the top 32 of the deflector, as best shown in Figures 5 and 7. The roller is provided with forwardly inclined teeth 41 which are adapted to penetrate the belt when the roller is held against rotation and lock the deflector to the belt so that the deflector will be carried as a unit wtih the belt to its initial position after each raking operation.

For locking the roller stationary the roller is provided with a tooth 42 which is engaged by a pawl 43 that is pivoted as shown at 44 on one of the hangers 40. The pawl is provided with an integral operating lever 45 which is pivotally connected as shown at 46 to a pin 47 that is slidably mounted in bearings 48 that rise from the top of the deflector. The pin is provided with stop collars 49 near the ends to limit sliding movement in either direction. The pin 47 extends in a direction longitudinally of the belt near one edge thereof and is adapted to contact with the stops formed by the projecting ends of the partitions 18 to be shifted thereby.

A lever 50 is pivoted intermediate its ends as shown at 51 and has its free end pivotally connected to the pin near the center thereof as shown at 52. A helical spring 53 is connected to the lever and to the top of the deflector to hold the lever in either of its shifted positions.

When the deflector has arrived at its limit of raking stroke the pin 47 will strike against the partition 18 and will be shifted endwise in the bearings 48 with a resultant rocking of the pawl 43 into engagement with the teeth 42 of the roller 39 thereby locking the roller stationary. When the roller is held stationary the teeth 41 penetrate the belt, and lock the deflector to the belt so that as the belt advances the deflector will be carried along with it to its initial position ready to begin its return raking stroke. As the deflector arrives at initial position the pin 41 will strike the adjacent partition 18 and again be shifted endwise in the opposite direction from the first described shifting movement thereof so that the pawl 43 is raised from engagement with the tooth 22 and thereupon the roller 39 is freed from the belt. The friction clutch 23 associated with the winding drum 22 of each deflector slips while the deflector is being carried by the belt to its initial position and permits the cable 25 to unwind. Just as soon as the pawl 43 disengages from the tooth 42 the friction clutch locks the drum to the shaft 20 whereupon the cable 25 begins to be wound upon the drum and moves the deflector forwardly along the belt to rake the fruit from the belt into the associated packers bin.

Some packers are quicker than others and consequently need a greater supply of fruit than the machine will automatically deliver when operating as just described. It has been seen that the purpose of the reciprocating deflectors is, normally, to deliver a uniform quantity of fruit to each packer. The belt moves at a uniform rate of speed and the deflectors move at a uniform rate, therefore, since the delivery of fruit on to the belt is more or less uniform a uniform quantity will be delivered throughout the length of the packing bins. However, because of the fact that different packers pack at faster speed than others, such packers will empty their bins quickly while in the meantime the slow packers' bins will be overflowing. Hence, there is a need for packer controlled means for halting the deflector at the fast packers' bin. While a deflector is stopped at a particular bin, the entire volume of fruit is delivered by the deflector and soon fills the bin, at which time the fast packer will release the deflector to continue its normal reciprocatory movement. Consequently it is desirable that each deflector be provided with manually controllable means to stop the deflector at any point in its raking stroke so that thereafter the lane of fruit will be continuously deflected into the packers bin through as long a period as the packer wishes. To accomplish this, as best shown in Figures 4 and 6, a substantially L-shaped lever 54 is pivoted on one of the guide strips 34, as shown at 55. The long arm of the lever projects downwardly into the path of a push rod 56 which is slidably fitted in guide strips 57 carried by the legs 10 at the entrance side of the packers bin. The short arm of the lever is provided with an offset hook 58 which engages over the top 32 of the deflector. It will thus be seen that when a packer pushes his push rod 56 forwardly the long leg of the lever 54 will impinge against the push rod and since the lever is normally locked against movement against the top of the deflector the deflector will be stopped, the friction clutch of the corresponding winding drum meanwhile slipping to again continue the raking stroke of the deflector when the operator withdraws the pin from engagement with the lever 54. The deflector will not deliver more fruit when stopped than when in operation but the fruit will be delivered to a given point, that is, the fast packers bin, which in effect is the same, since the slow packers can be working fruit out of their bins in the meantime.

It is to be understood that more than one packer works at each of the bins. The bins are partitioned off to separate the sizes, for example if the machine is delivering three sizes to the distributing belt, there will only be two partitions and consequently three bins. However said bins are large enough for several packers to work therefrom. On a machine with three bins, as many as thirty or forty packers may be working, ten or twelve to each bin, depending on the run of sizes. If ten packers are working in a bin, normally the deflector would deliver a like amount to each packer, but to increase the efficiency it is necessary for each packer to work to full capacity, and since no two packers pack at the same rate, it is desirable to halt the deflector at the fastest packer's bin, in order to deliver to that fast packer a larger quantity of fruit than will be delivered to the other packers during a given time period.

The lever 54 may be rocked on its pivot 55 to the dotted line position shown in Figure 6 when it is not desirable to use the manually controlled push rods 56. A locking bolt 59 may be passed through an opening 60 in the short leg of the lever and a similar opening 61 in a lug 62 which rises from the top of the deflector to lock the lever in inoperative position.

The only difference between the above described embodiment of the invention, and the modified form of the invention shown in Figures 9, 10 and 11 is that the toothed roller 39 and drums 22 are dispensed with and a sprocket gear is employed to carry the deflector through its raking stroke to rake the fruit off the belt. Also the deflector is provided with a sled-like runner 9 so that the deflector will have good frictional engagement with the belt to pull the pawl.

The sprocket gear 63 is mounted on a hanger 64 which extends downwardly from the top of the deflector and meshes with a sprocket chain 65 which extends longitudinally along one edge of the endless conveyor and is trained over sprocket gears one of which may be driven by a chain drive 65' from one of the shafts of the endless conveyor rollers to drive the chain in an opposite direction to the conveyor so that when the pawl 43, which has been previously described, is engaged between the teeth of the sprocket gear 63 the gear is locked stationary, and the chain then carries the deflector oppositely to the direction of travel of the conveyor belt to scrape the fruit off the belt. The sprocket gear idles on the sprocket chain while the deflector is being returned, by frictional engagement with the belt, to initial position to begin another deflecting stroke.

In the modified form of the invention the packers control, the deflectors only when the deflectors are moving in the same direction as the belt and not when in engagement with the chain on the return trip.

Since all of the other parts of the modified form of the invention are the same as previously described, the several parts in the Figures 9 to 11 inclusive have been given the same reference characters as in Figures 1 to 8 inclusive.

In both forms of the invention the fruit will form in lanes on the belt once it has time to settle on the same.

From the above description it is thought that the construction and operation of the invention will be fully understood without further explanation.

What is claimed is:

1. A fruit distributing machine comprising, an endless conveyor, packers bins disposed laterally of the conveyor, means for guiding fruit of graduated sizes in separate lanes on the conveyor, deflectors superposed on the conveyor, power driven winding drums, cables connected to the deflectors and wound up upon the drums to move the deflectors in a direction counter to the direction of travel of the conveyor for raking the lanes of fruit into the bins, and means for moving the deflectors in the direction of travel of the conveyor to initial starting position after each raking stroke.

2. A fruit distributing machine comprising, an endless conveyor, packers bins disposed laterally of the conveyor, deflectors superposed on the conveyor, means for moving the deflectors counter to the direction of travel of the conveyor for raking the fruit into the bins, means for moving the deflectors in the direction of travel of the conveyor to initial starting position after each raking stroke, and manually controlled means for selectively halting the deflectors during the raking stroke, the deflectors when halted deliver a greater quantity of the fruit to a portion of the bins.

3. A fruit distributing machine comprising, an endless conveyor, packers bins disposed laterally of the conveyor, deflectors for raking the fruit from the conveyor into the bins, means for moving the deflectors through their raking stroke in a direction counter to the direction of travel of the conveyor, and means engageable with the belt of the conveyor for moving the deflectors as a unit with the conveyor to initial starting position after each raking stroke.

4. A fruit distributing machine comprising, an endless conveyor, packers bins disposed laterally of the conveyor, deflectors for raking the fruit from the conveyor into the bins, means for moving the deflectors through their raking stroke in a direction counter to the direction of travel of the conveyor, rollers carried by the deflectors, and means for automatically locking the rollers to the belt of the conveyor at the end of the raking stroke for moving the deflectors as a unit with the conveyor to initial starting position after each raking stroke.

5. A fruit distributing machine comprising an endless conveyor, packers bins disposed laterally of the conveyor, deflectors for raking the fruit from the conveyor into the bins, means for moving the deflectors through their raking strokes in a direction counter to the direction of travel of the conveyor, stops carried by the bins, pawl controlled toothed rollers carried by the deflectors, and pins slidably mounted on the deflectors and pivotally connected to the pawls, said pins being adapted to engage one of said stops and disengage the pawls to permit the rollers to idle through the raking stroke, said pins being adapted to engage the other of said stops to engage the pawls for locking the rollers against rotation with teeth thereof engaged with the belt of the conveyor for moving the deflectors as a unit with the conveyor to initial starting position after each raking stroke.

6. A fruit distributing machine comprising, an endless conveyor, packers bins disposed laterally of the conveyor, deflectors frictionally engaging the conveyor and traveling with the conveyor to deflect the fruit from the conveyor into the bins, an endless chain, means for driving the chain counter to the conveyor, pawl controlled sprocket gears carried by the deflectors and meshing with the chain, stops at the ends of the bins overlapping the conveyor, and pins slidably mounted on the deflectors and pivotally connected to the pawls of the gears, said pins being adapted to engage one of said stops and dislodge the pawls to permit the gears to idle on the chain during travel of the deflectors as a unit with the conveyor, said pins being adapted to engage the other of said stops to engage the pawls and lock the gears against rotation whereby the chain carries the deflectors bodily counter to the direction of movement of the conveyor to rake the fruit off the conveyor.

7. A fruit distributing machine comprising, an endless conveyor, packers bins disposed laterally of the conveyor, deflectors superposed upon the conveyor, means for separating graded fruit in respective lanes on the conveyor, the deflectors having deflecting walls extending obliquely across the conveyor, the walls being of respectively different lengths whereby each wall deflects a respective lane of fruit and permits the other lanes of fruit to pass unobstructed along the conveyor, and means for reciprocating the deflectors longitudinally of their respective bins for raking the lanes of fruit from the conveyor into respective bins.

8. A fruit distributing machine comprising, an endless conveyor, packers bins disposed laterally of the conveyor, a deflector on the conveyor associated with each bin for raking the fruit from the conveyor into the bin, means for moving each deflector in a direction counter to the direction of travel of the conveyor, means for moving each deflector in the direction of travel of the conveyor to initial starting position after each raking stroke, and bin controlled means controlling the first and the second named means to reverse the direction of travel of each deflector at the end of each stroke thereof.

9. A fruit distributing machine comprising, an endless conveyor, packers bins disposed laterally of the conveyor, a deflector on the conveyor associated with each bin for raking the fruit from the conveyor into the bin, a yielding clutch controlled power driven winding drum for each deflector, a cable connecting the drum with the associated deflector, winding of the cables on the drums moving the deflectors as a unit through their raking stroke in a direction counter to the direction of travel of the conveyor, means for moving the deflectors as a unit in the direction of travel of the conveyor to initial starting position after each stroke, the clutches of the drums slipping and permitting the drums to unwind the cables during actuation of said means, and means controlling the first named means to reverse the direction of travel of the deflectors at the end of the raking stroke.

10. A fruit distributing machine comprising an endless conveyor, packers bins disposed laterally of the conveyor, a plurality of deflectors disposed on the conveyor, means for moving the deflectors in a direction counter to the direction of travel of the conveyor for raking the fruit into the bins, means for moving the deflectors in the direction of travel of the conveyor to initial starting position after each raking stroke, manually controlled means for selectively halting the deflectors at certain packers bins whereby the halted deflectors may deliver a greater quantity of fruit to a portion of such bins at predetermined times, and means for rendering the deflector stopping means inactive.

JOHN R. FITZGERALD.